US011164099B2

(12) United States Patent
Horesh et al.

(10) Patent No.: US 11,164,099 B2
(45) Date of Patent: Nov. 2, 2021

(54) QUANTUM SPACE DISTANCE ESTIMATION FOR CLASSIFIER TRAINING USING HYBRID CLASSICAL-QUANTUM COMPUTING SYSTEM

(71) Applicant: International Business Machines Corporation, Armonk, NY (US)

(72) Inventors: Lior Horesh, North Salem, NY (US); John A. Gunnels, Somers, NY (US); Tal Kachman, Haifa (IL); Catherine H. Crawford, Carmel, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 354 days.

(21) Appl. No.: 16/279,104

(22) Filed: Feb. 19, 2019

(65) Prior Publication Data
US 2020/0265333 A1 Aug. 20, 2020

(51) Int. Cl.
*G06F 15/16* (2006.01)
*G06N 10/00* (2019.01)

(52) U.S. Cl.
CPC ............. *G06N 10/00* (2019.01); *G06F 15/16* (2013.01)

(58) Field of Classification Search
CPC ......... G06N 10/00; G06N 20/10; G06F 15/16
USPC ........................................................ 709/62
See application file for complete search history.

(56) References Cited

U.S. PATENT DOCUMENTS

| 8,175,995 | B2 | 5/2012 | Amin | |
|---|---|---|---|---|
| 8,370,280 | B1* | 2/2013 | Lin | ........................ G06N 20/00 706/12 |
| 10,339,468 | B1* | 7/2019 | Johnston | .................. G06N 5/04 |
| 2008/0120646 | A1* | 5/2008 | Stern | ..................... G06Q 30/02 725/34 |
| 2008/0140749 | A1* | 6/2008 | Amato | ................... B82Y 10/00 708/490 |
| 2016/0055132 | A1* | 2/2016 | Garrison | ................ G06N 20/00 706/12 |
| 2016/0063209 | A1* | 3/2016 | Malaviya | ............... G16H 50/30 706/12 |
| 2017/0124483 | A1* | 5/2017 | Huang | ................... G06Q 30/00 |
| 2017/0193401 | A1* | 7/2017 | Grehant | ............. G06F 16/2272 |

(Continued)

OTHER PUBLICATIONS

Zhang, Dan-Bo, et al., "Nonlinear Regression Based on a Hybrid Quantum Computer," arXiv preprint arXiv:1808.09607, 2018, 6 pages.

(Continued)

*Primary Examiner* — Tesfay Yohannes
(74) *Attorney, Agent, or Firm* — Garg Law Firm, PLLC; Rakesh Garg; Joseph Petrokaitis (57) ABSTRACT

Hybrid classical-quantum decision maker training includes receiving a training data set, and selecting, by a first processor, a sampling of objects from the training set, each object represented by at least one vector. A quantum processor applies a quantum feature map to the selected objects to produce one or more output vectors. The first processor determines one or more distance measures between pairs of the output vectors, and determines at least one portion of the quantum feature map to modify the classical feature map. The first processor adds an implementation of the at least one portion of the quantum feature map to the classical feature map to generate an updated classical feature map.

16 Claims, 7 Drawing Sheets

(56) References Cited

U.S. PATENT DOCUMENTS

2018/0011981 A1* 1/2018 El Naqa .................. G06N 10/00
2018/0349605 A1* 12/2018 Wiebe .................... G06N 10/00
2020/0167682 A1* 5/2020 Watson .................. G06N 20/00

OTHER PUBLICATIONS

Schuld, Maria, et al., "Circuit-centric Quantum Classifiers," arXiv preprint arXiv:1804.00633, 2018, 17 pages.

* cited by examiner

QUANTUM SPACE DISTANCE ESTIMATION FOR CLASSIFIER TRAINING USING HYBRID CLASSICAL-QUANTUM COMPUTING SYSTEM

TECHNICAL FIELD

The present invention relates generally to quantum classifier training using quantum computing. More particularly, the present invention relates to a system and method for quantum space distance estimation for classifier and other quantum decision making system training using a hybrid classical-quantum computing system.

BACKGROUND

Hereinafter, a "Q" prefix in a word of phrase is indicative of a reference of that word or phrase in a quantum computing context unless expressly distinguished where used.

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we commonly use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented by 1 and 0.

A quantum processor (q-processor) uses the unique nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 inference between possible outcomes for an event. Entanglement means that qubits in a superposition can be correlated with each other in a non-classical way; that is, the state of one (whether it is a 1 or a 0 or both) can depend on the state of another, and that there is more information contained within the two qubits when they are entangled than as two individual qubits.

Using these two principles, qubits operate as processors of information, enabling quantum computers to function in ways that allow them to solve certain difficult problems that are intractable using conventional computers.

In machine learning, a classical support vector machine (SVM) is a supervised learning model associated with learning algorithms that classify data into categories. Typically, a set of training examples are each marked as belonging to a category, and a SVM training algorithm builds a model that assigns new examples to a particular category. A SVM model is a representation of the examples as points in a feature space mapped so that the examples of the separate categories are divided by a gap in the feature space. The feature map refers to mapping of a collection of features that are representative of one or more categories. Using an SVM algorithm, new input data is mapped into the same feature space and predicted to belong to a category based upon a distance from the new example to the examples representative of a category utilizing the feature map. Typically, a SVM performs classification by finding a hyperplane that maximizes the margin between two classes. A hyperplane is a subspace whose dimension is one less than that of its ambient space, e.g., a three-dimensional space has two-dimensional hyperplanes.

The illustrative embodiment recognizes that a quantum decision making system, such as a quantum classifier, a quantum regressor, a quantum controller or a quantum predictor, may be used to analyze input data and make a decision regarding the input data by a quantum classifier. For example, a quantum classifier, such as a quantum support vector machine (QSVM), may be used to analyze input data and determine a discrete classification of the input data by a quantum processor. In other examples, a regressors, controllers, or predictors may operate on continuous space entities. A quantum classifier, such as a QSVM, implements a classifier using a quantum processor which has the capability to increase the speed of classification of certain input data. The illustrative embodiments recognize that training a quantum classifier and other quantum decision making systems typically require a large sample of input data.

The illustrative embodiments recognize that a conventional solution clusters points using a classic distance metric such as the L1 norm metric which calculates a rectilinear distance between points. However, embodiments recognize that such a solution may not be effective for quantum classifiers as the L1 norm or any conventional norm will not accurately reflect distance in the quantum Hilbert space of the quantum processor. If a quantum classifier map is needed, data points classified in the target mapping have distances that may have little in common with L1 norms or other conventional distance measures. The illustrative embodiments recognize that a need exists for a novel method to approximate classical distance in a quantum space by a measure capable of computation effectively on a classical computer.

SUMMARY

The illustrative embodiments provide a method, system, and computer program product for quantum space distance estimation for quantum decision making system training using a hybrid classical-quantum computing system. An embodiment of a method for hybrid classical-quantum decision maker training includes receiving a training data set, and selecting, by a first processor, a sampling of objects from the training set, each object represented by at least one vector. The embodiment further includes applying, by a quantum processor, a quantum feature map to the selected objects to produce one or more output vectors. The embodiment further includes determining, by the first processor, one or more distance measures between pairs of the output vectors. The embodiment further includes determining, by the first processor, at least one portion of the quantum feature map to modify the classical feature map. The embodiment still further includes adding, by the first processor, an implementation of the at least one portion of the quantum feature map to the classical feature map to generate an updated classical feature map. Thus, the embodiment provides for quantum space distance estimation for classifier training using a hybrid classical-quantum computing system to improve classification of data.

Another embodiment further includes removing the determined portions from the quantum feature map to generate an updated quantum feature map. Thus, the embodiment provides for improving the quantum feature map to provide improved classification of data.

Another embodiment further includes applying an updated approximating function of the updated classical feature map to the vectors to generate updated output vectors. Thus, the embodiment provides for improving the approximating function to provide improved classification of data. Another embodiment further includes determining that the updated approximating function produces a measure of accuracy greater than a predetermined threshold value. Thus, the embodiment provides for determining improved classification of data to meet a predetermined accuracy.

Another embodiment further includes selecting updated training samples from the training data set, and applying the updated quantum feature map to the updated sampled objects to compute new output vectors. Another embodiment further includes applying the updated quantum feature map to the selected sampled objects to compute new output vectors. Thus, one or more of the embodiments provides for computing of new output vectors to provide improved classification of data.

In another embodiment, the one or more distance measures includes a relative distance between output vector pairs. In another embodiment, the one or more distance measures includes an absolute distance between output vector pairs. In another embodiment, the one or more distance measures includes a classical distance measure. Thus, one or more of the embodiments provides for implementing a difference measure suitable for a particular application.

In another embodiment, the at least one portion includes a portion of the quantum feature map implementable by a known classical function. In another embodiment, the at least one portion is selected based upon machine learning. In another embodiment, the first processor is a classical processor. Thus, the embodiment provides for improved classification of data using a classical computer.

In an embodiment, the method is embodied in a computer program product comprising one or more computer-readable storage devices and computer-readable program instructions which are stored on the one or more computer-readable tangible storage devices and executed by one or more processors.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments used to describe the invention generally address and solve the above-described problem of solving computational problems using quantum computing. The illustrative embodiments provide a method and system for quantum space distance estimation for classifier training using a hybrid classical-quantum computing system.

An embodiment provides a method for improving classification of data using hybrid classical-quantum computing system. Another embodiment provides a conventional or quantum computer usable program product comprising a computer-readable storage device, and program instructions stored on the storage device, the stored program instructions comprising a method for enhancing classification of data using hybrid classical-quantum computing system. The instructions are executable using a conventional or quantum processor. Another embodiment provides a computer system comprising a conventional or quantum processor, a computer-readable memory, and a computer-readable storage device, and program instructions stored on the storage device for execution by the processor via the memory, the stored program instructions comprising a method for enhancing classification of data using hybrid classical-quantum computing system.

One or more embodiments provide for a mixed classical and quantum methodology that co-evolves classical and quantum feature maps and classical approximating functions. In one or more embodiments, a classical computer is used to store a large data set associated with classification training data, and a quantum computer is used to simultaneously evaluate a quality of the feature maps, sampling of the training data, and the approximating functions.

In an embodiment, it is assumed that a QSVM is slow, accurate with the right feature map, and sensitive to sampling of the training data. In the embodiment, a limited set of parameterized feature maps are obtained, and distances between data points in the quantum space are estimated with classical functions such as a lifting function representing a reproducing kernel Hilbert space (RKHS) mappings. In particular embodiments, the feature maps may be based upon a circuit description of a quantum circuit. In the embodiment, the quantum distances are used to determine an optimal feature map to provide for an optimal approximating function of the classifier. In an embodiment, a classical computer determines, from a quantum feature map and a small number of data points, a classical feature map that provides a best approximation. In particular embodiments, the classical feature map may be evolved from the quantum circuit or a set of classical feature maps previously co-evolved with a quantum feature map.

In the embodiment, the classical computer searches for an approximating classical feature map based upon a quality measure obtained from distance measurements. In particular embodiments, the distance measurement a linear or non-linear distance measurement. In one or more embodiments, the distance metric may include one or more of a distance between centroids of classes, a distance between elements of each class (e.g., all-to-all), a distance between centroids of class clusters, center of mass distances using density and entropy functions. In particular embodiments, different distance criteria may be used for different data sets.

In the embodiment, the classical computer clusters training samples based upon the approximating function and uses the QSVM to judge a quality of the underlying quantum feature map. In the embodiment, the quantum computer has a set of quantum feature maps and the classical computer may find the best quantum feature map. In the embodiment, the classical computer finds a best approximating classical feature map and iterates with the candidate feature map until an acceptable approximating function for the data set is achieved. In particular embodiments, the approximating function length and/or complexity may be determined by computation costs, a dictated length, and/or a time to solution. In particular embodiments, feature map candidates may be warm-started or eliminated via analysis of a circuit description of the feature map.

Accordingly, one or more embodiments provide for a system and method that enables intelligent subsampling of a complex feature space typically requiring a quantum computer using a classical computer. Various embodiments provide for a classical/quantum methodology that co-evolves the feature maps and the classical approximating functions, and the quantum computer is used to simultaneously evaluate the quality of the feature maps, the sampling of the training data, and the approximating functions.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for enhancing quantum classification using a variety of components that can be purposed or repurposed to provide a described function within a data processing environment, and such adaptations are contemplated within the scope of the illustrative embodiments.

The illustrative embodiments are described with respect to certain types of steps, applications, classical processors, quantum processors, quantum states, classical feature spaces, quantum feature spaces, and data processing environments only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
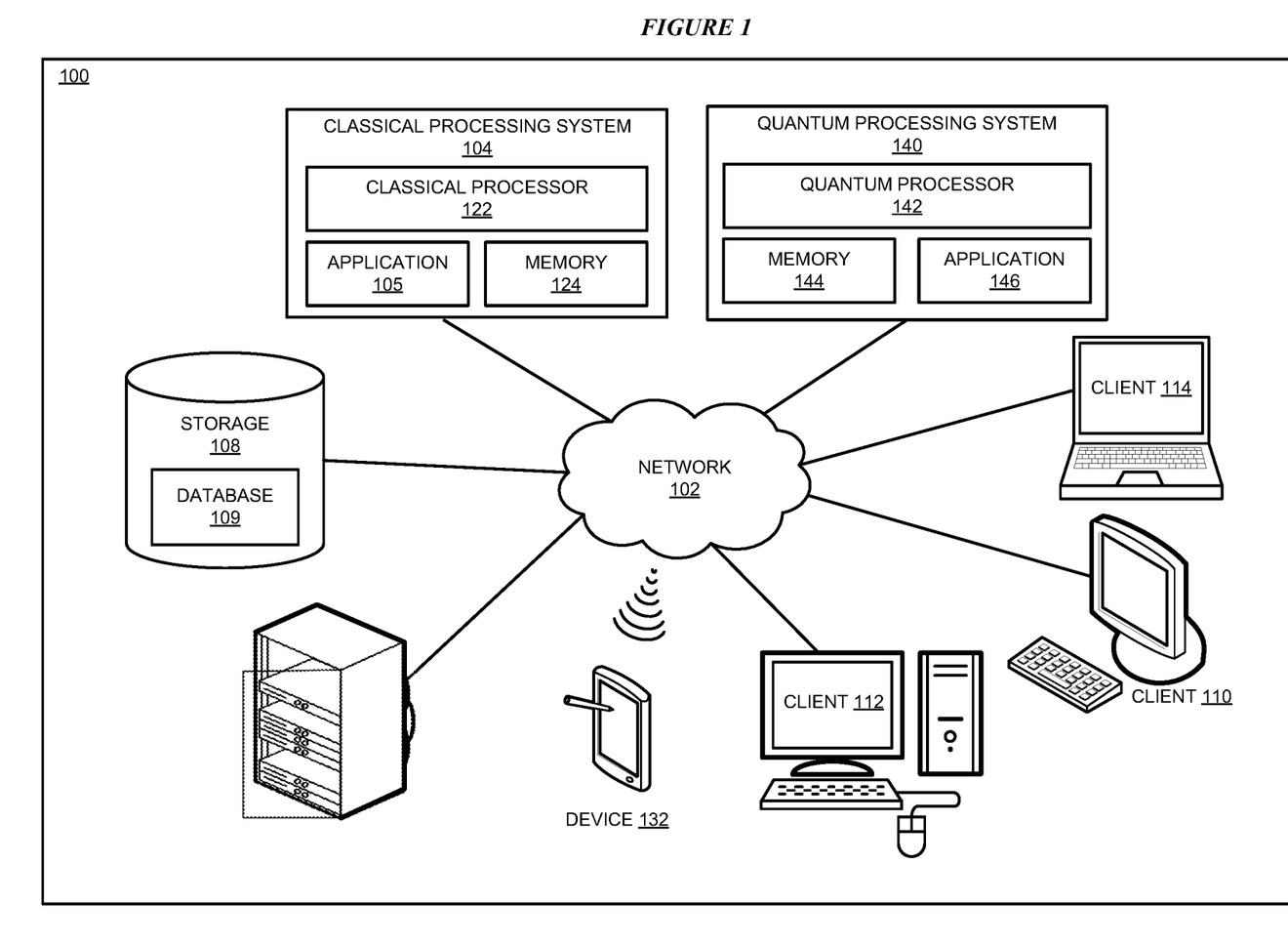
FIG. 1 depicts a block diagram of a network of data processing systems in which illustrative embodiments may be implemented.
Figure 2:
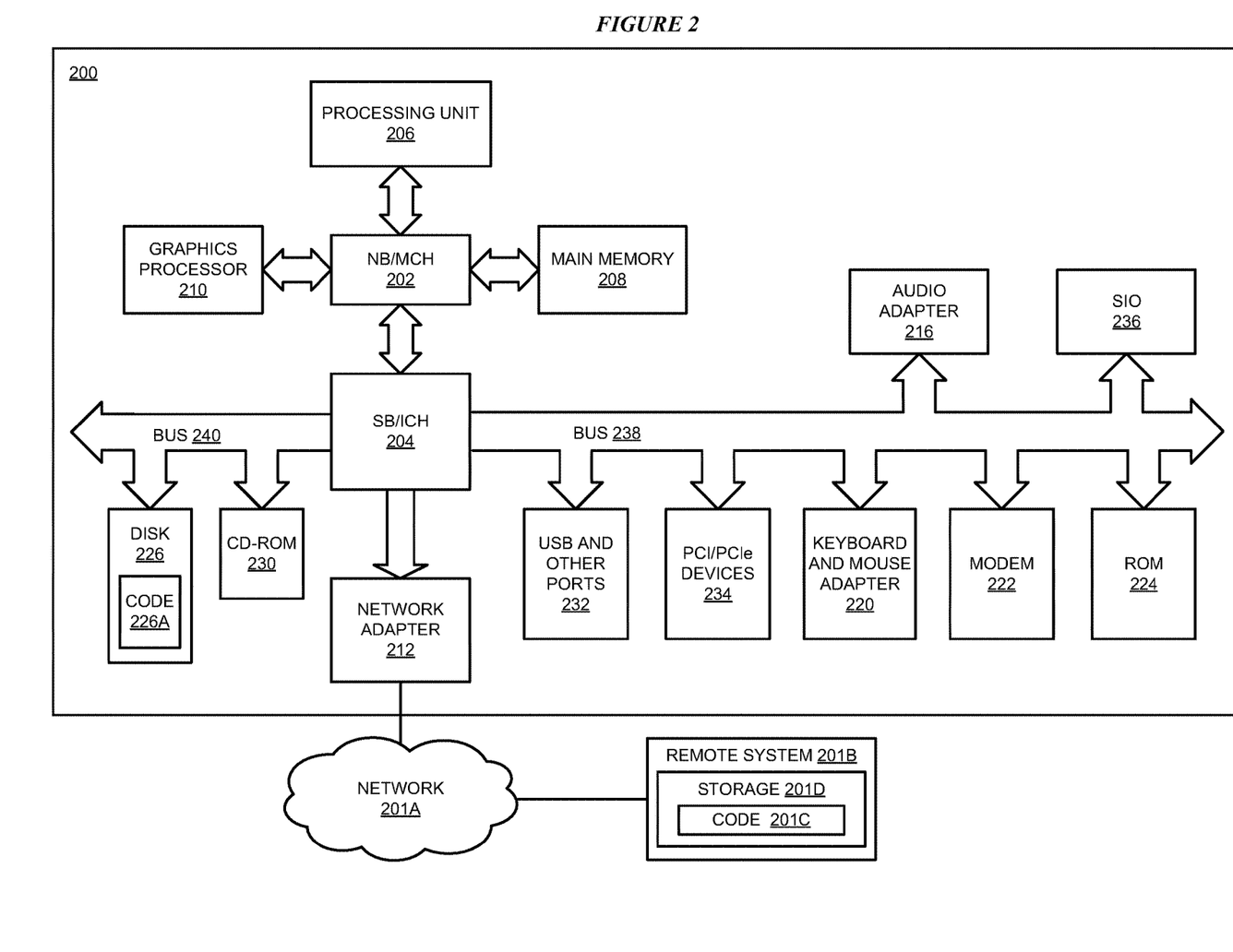
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Classical processing system 104 couples to network 102. Classical processing system 104 is a classical processing system. Software applications may execute on any quantum data processing system in data processing environment 100. Any software application described as executing in classical processing system 104 in FIG. 1 can be configured to execute in another data processing system in a similar manner. Any data or information stored or produced in classical processing system 104 in FIG. 1 can be configured to be stored or produced in another data processing system in a similar manner. A classical data processing system, such as classical processing system 104, may contain data and may have software applications or software tools executing classical computing processes thereon.

Server 106 couples to network 102 along with storage unit 108. Storage unit 108 includes a database 109 configured to store classifier training data as described herein with respect to various embodiments. Server 106 is a conventional data processing system. Quantum processing system 140 couples to network 102. Quantum processing system 140 is a quantum data processing system. Software applications may execute on any quantum data processing system in data processing environment 100. Any software application described as executing in quantum processing system 140 in FIG. 1 can be configured to execute in another quantum data processing system in a similar manner. Any data or information stored or produced in quantum processing system 140 in FIG. 1 can be configured to be stored or produced in another quantum data processing system in a similar manner. A quantum data processing system, such as quantum processing system 140, may contain data and may have software applications or software tools executing quantum computing processes thereon.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several conventional data processing systems, quantum data processing systems, and a data network as shown, whereas another embodiment can be implemented on a single conventional data processing system or single quantum data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, classical processing system 104, quantum processing system 140, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to classical processor 122. Classical processor 122 may include its own data, boot files, operating system images, and applications. Data processing environment 100 may include additional memories, quantum processors, and other devices that are not shown. Memory 124 includes application 105 that may be configured to implement one or more of the classical processor functions described herein for solving mixed integer optimization problems on a hybrid classical-quantum computing system in accordance with one or more embodiments.

In the depicted example, memory 144 may provide data, such as boot files, operating system images, and applications to quantum processor 142. Quantum processor 142 may include its own data, boot files, operating system images, and applications. Data processing environment 100 may include additional memories, quantum processors, and other devices that are not shown. Memory 144 includes application 146 that may be configured to implement one or more of the quantum processor functions described herein in accordance with one or more embodiments.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as classical processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
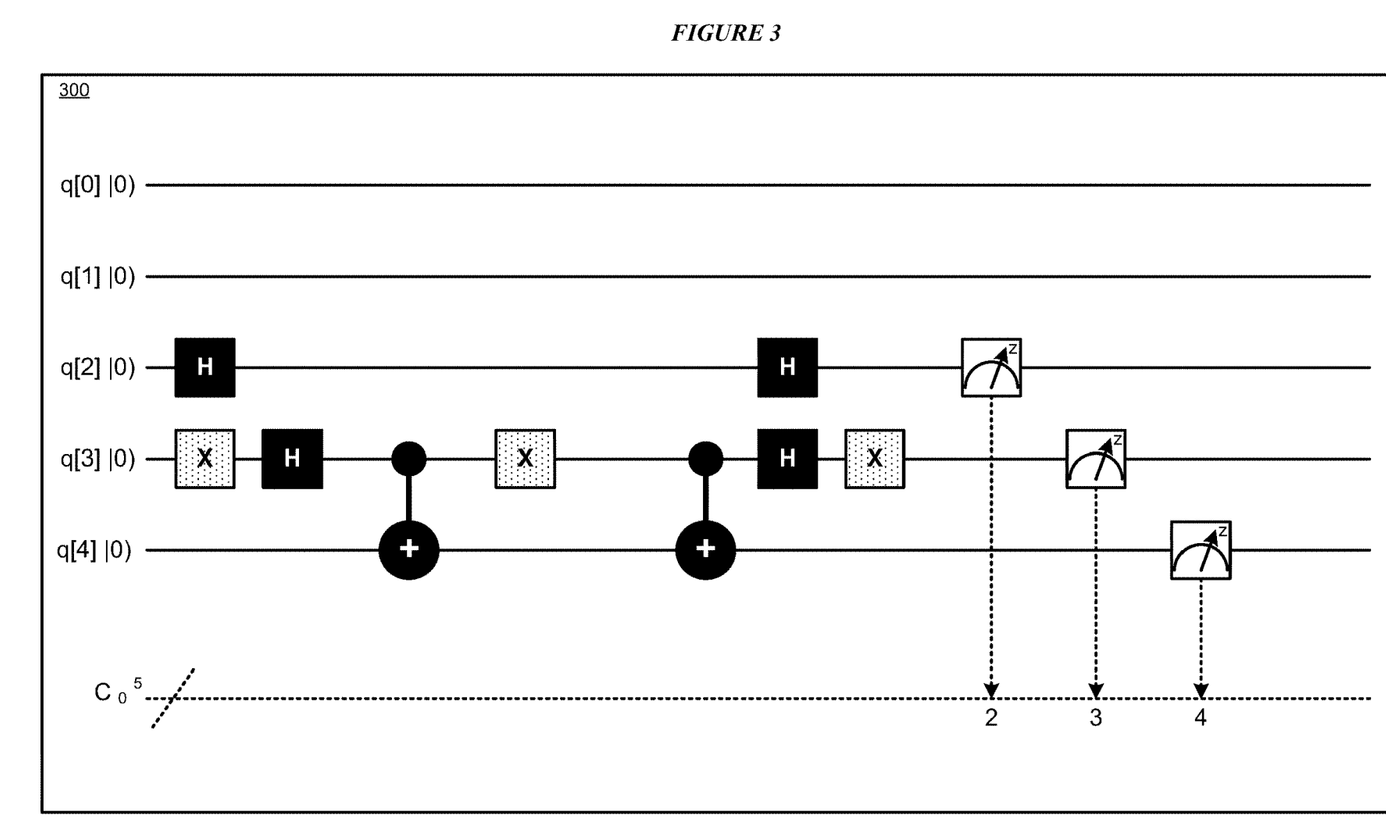
FIG. 3 depicts a block diagram of an example general quantum circuit for classifier training using a hybrid classical-quantum computing system in accordance with an illustrative embodiment.

With reference to FIG. 3, this figure depicts a block diagram of an example general quantum circuit 300 for classifier training using a hybrid classical-quantum computing system in accordance with an illustrative embodiment. In the example, quantum circuit 300 includes a number of quantum logic gates that may be used to implement a quantum feature space to compute an output vector from a received input vector using a quantum space map as described herein with respect to one or more embodiments. Quantum circuit 300 includes five: a first qubit $q[0]|0>$, a second qubit $q[1]|0>$, a third qubit $q[2]|0>$, a fourth qubit $q[3]|0>$, and a fifth qubit $q[4]|0>$.

In the illustrated example, third qubit $q[2]|0>$ is coupled to a first and second Hadamard (H) gate, and a first qubit measurement component measures the qubit. An H gate maps a basis state of a qubit to a state having an equal probability of becoming a 0 or a 1. A qubit measurement component measures the state of a qubit. Fourth qubit q[3]|0> is coupled to a first bit-flip NOT (X) gate, and the first X gate is coupled to a third H gate. An X gate is the quantum equivalent of a NOT gate for classical computers. The third H gate is coupled to a second X gate, and the second X gate is further coupled to a fourth H gate. The output of third H gate is further coupled to fifth qubit q[4]|0> by a first controlled X (+) gate, and the output of the second X gate is coupled to fifth qubit q[4]|0> by a second controlled X (+) gate. A controlled X gate performs a Not operation on a second qubit only when a second qubit is =1>. The output of the fourth H gate is further coupled to a third X gate. Third X gate is coupled to a second qubit measurement component. For the fifth qubit q[4]|0>, the output of the second controlled X (+) is coupled to a third qubit measurement component. Quantum circuit 300 is presented as a generalized example of a quantum circuit for implementing one or more quantum feature maps as described herein. In a specification implementation of a quantum feature map, a quantum circuit may include any number of arrangements of quantum gates to implement a corresponding feature space in accordance with one or more embodiments.

Figure 4:
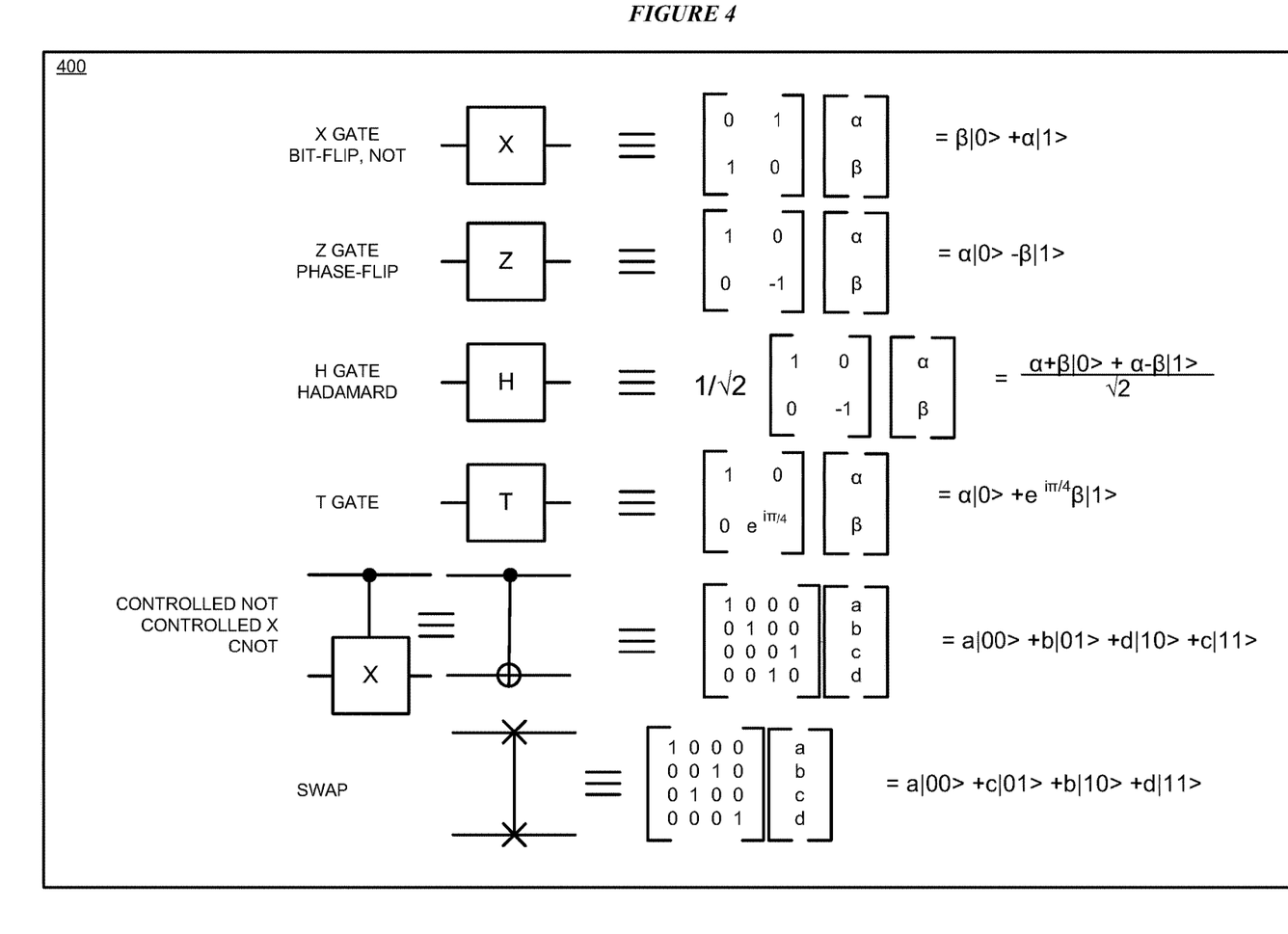
FIG. 4, this figure depicts a simplified diagram of matrix representations of example general quantum circuit gates in accordance with an illustrative embodiment.

With reference to FIG. 4, this figure depicts a simplified diagram 400 of matrix representations of example general quantum circuit gates in accordance with an illustrative embodiment. In the illustrate example, matrix representations and corresponding linear equations of an bit-flip NOT (X) gate, a phase-flip (Z) gate, a Hadamard (H) gate, a phase shift (T) gate, a controlled NOT (controlled X or CNOT) gate, and a swap gate are shown.

Figure 5:
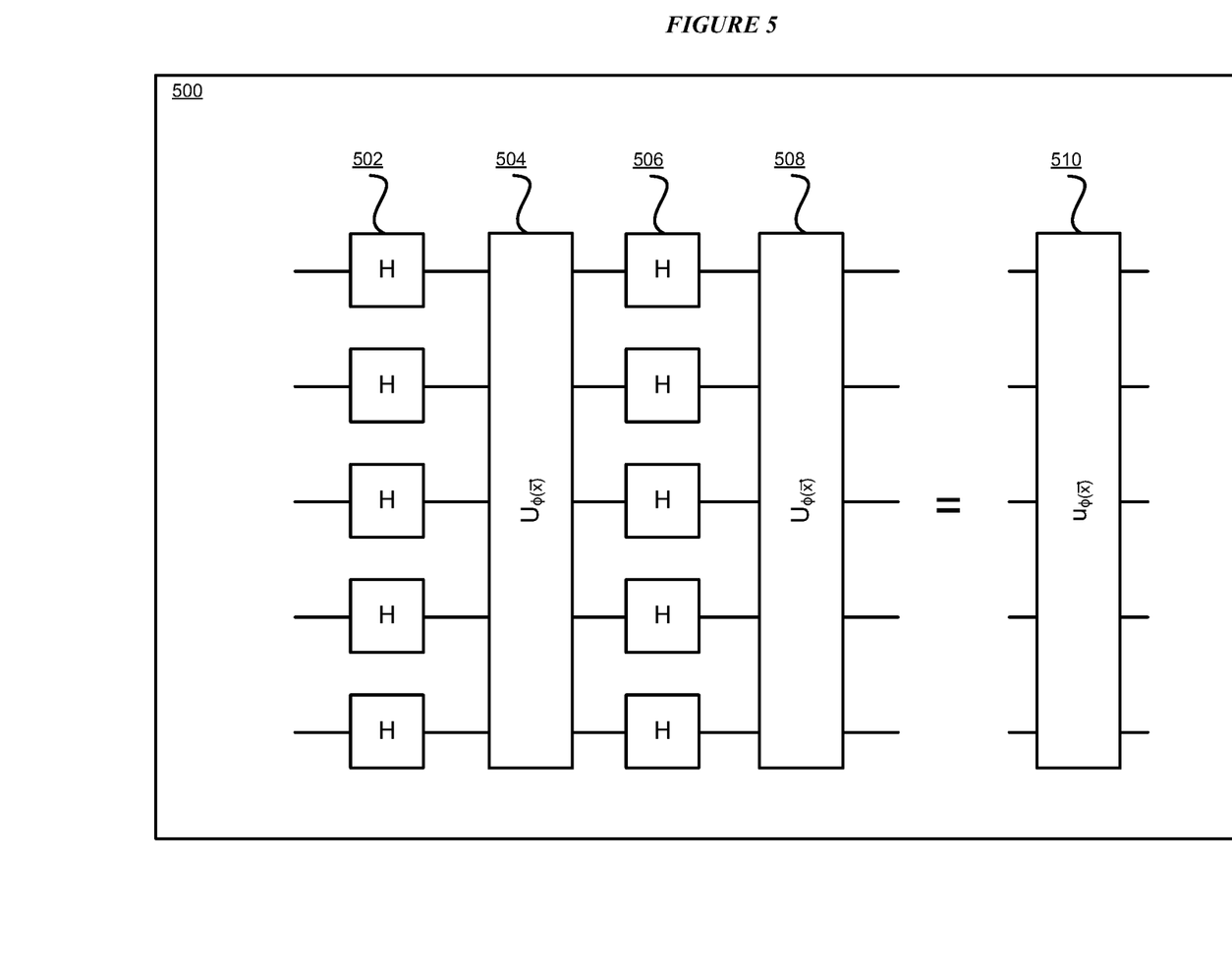
FIG. 5 depicts a block diagram of an example quantum feature map circuit for classifier training using a hybrid classical-quantum computing system in accordance with an illustrative embodiment.

With reference to FIG. 5, this figure depicts a block diagram of an example quantum feature map circuit 500 for classifier training using a hybrid classical-quantum computing system in accordance with an illustrative embodiment. In the example, quantum feature map circuit 500 applies a first layer of H gates 502 to a first diagonal phase gate component 504. Quantum feature map circuit 500 further applies a second layer of H gates 506 followed by a second diagonal phase gate component 508. As a result, an equivalent circuit 510 is obtained to encode both the actual function value of the phase as well as the value of the Fourier transform for every basis element. A quantum feature map implemented by quantum feature map circuit 500 functions to make input data linearly separable into categories as required by a SVM/QSVM as it imposes hyperplanes on the "lifted" (e.g., feature map applied) data.

Figure 6:
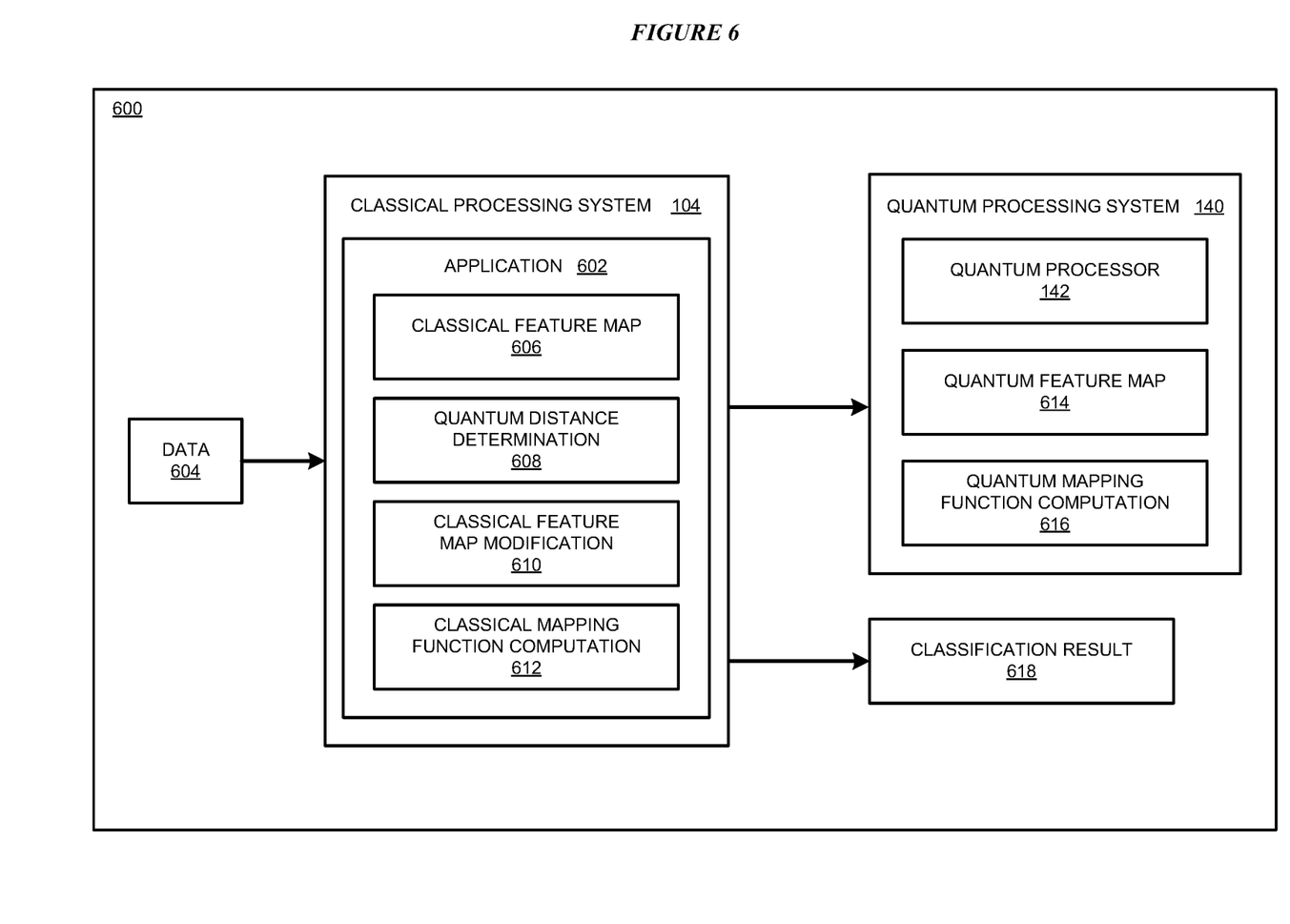
FIG. 6 depicts a block diagram of an example configuration for classifier training using a hybrid classical-quantum computing system in accordance with an illustrative embodiment.

With reference to FIG. 6, this figure depicts a block diagram of an example configuration 600 for classifier training using a hybrid classical-quantum computing system in accordance with an illustrative embodiment. The example embodiment includes classical processing system 104 and quantum processing system 140. Classical processing system 104 includes an application 602. In a particular embodiment, application 602 is an example of application 105 of FIG. 1. Application 602 is configured to received data 604. In one or more embodiments, data 604 includes one or more training data for training a classifier and input data for classification using the trained classifier. Application 602 includes a classical feature map 606, a quantum distance determination component 608, and classical feature map modification component 612. Quantum processing system 140 includes a quantum processor 142, a quantum feature map 614, and a quantum mapping function computation component 616.

In the embodiment, application 602 is configured to select a sampling of objects from training data and provide the sampled objects to quantum processor 142 of quantum processing system 140. Quantum mapping function computation component 616 is configured to apply quantum feature map 614 to the sampled objects configured as input vectors to generate output vectors. Quantum distance determination component 608 of classical processing system 104 is configured to determine one or more quantum distances between pairs of the output vectors to determine absolute and relative distances between each of the output vector pairs.

Classical feature map modification component 610 is configured to use the determined quantum distances to identify one or more portions of the quantum circuit to be replaced within classical feature map 606, replaces the identified portion in quantum feature map 614 with a corresponding portion in classical feature map 606, and removes the identified portion from quantum feature map 614. In particular embodiments, the one or more portions include chunks of the quantum circuit that can be simulated in less than a given time, or chunks that can be emulated or approximated by a known function. In particular embodiments, if no known approximation exists, classical feature map modification component 610 selects a candidate for approximation for part of the quantum circuit using symbolic regression.

Classical mapping function computation component 612 is configured to compute a new set of vectors using the current classical feature map 606 and determine whether the current function produces hybrid classical and quantum classifier having acceptable accuracy.

Application 602 is further configured to receive input data which is desired to be classified and classical processing system 104 applies classical feature map 606 to classical input vectors of the input vectors and quantum processing system 140 applies quantum feature map 614 to quantum feature vectors of the input data. As a result of the hybrid classical-quantum classifier, application 602 outputs a classification result 618 including a classification of the input data.

In one or more embodiments, a feature map is applied to one or more vectors describing features of items of interest. In particular embodiments, the vectors are represented by floating-point numbers. In the embodiment, the feature map "lifts" the items from one dimensionality to another so that a linear discriminator (e.g., a hyperplane) can shatter between items of different classes.

In a QSVM, the mapping function is represented by a purposely determined quantum circuit that may not be practical to simulate using a classical computer in order to provide an advantage to a quantum implementation of a classifier. In the QSVM, a quantum mapping function is applied to an input vector to produce an output vector in which the quantum mapping function is a quantum feature map described by a quantum program or quantum gate diagram. In the output feature space, the classical computer and/or the quantum computer inserts hyperplanes or other linear discriminators between objects of different classes to separate the classes.

In accordance with various embodiments, a classical feature map is created that mimics the important qualities of the quantum feature map such that that objects that are close to each other by one or several distance metrics in the output space of the quantum feature map are also close to each other in the space of the classical feature map. Conversely, objects that are far apart in the quantum feature space are also far apart in the corresponding classical feature map.

In an example algorithm according to an embodiment, application 602 selects a sampling of objects from a larger training data set. In particular embodiments, the objects are selected from the training set using a random sampling. In one or more particular embodiments, the objects are randomly selected by use of a classical distance measure, such as L1 norm, or randomly selected, based on a function that is a practical-to-compute subset of the quantum feature map.

In the embodiment, quantum processor 142 uses a quantum program to apply quantum feature map 614 to the sampled objects as input vectors to generate output vectors. In an alternative embodiment, classical processing system 104 uses a simulation to apply the input vectors to the quantum feature map to generate the output vectors for situations in which the number of objects in the sample is small enough to be simulated on a classical processor.

In the embodiment, application 602 computes one or more distance measures between the output vectors to determine both an absolute and relative distance between each pair of output vectors. For example, application 602 may determine that vector v1 is closest to vector v3, and that the next closest vector is vector v8. In another example, application 602 may determines that vector v1 is twice as far from vector v8 as from vector v3.

In the embodiment, application 602 determines one or more portions of quantum feature map 614 that are appropriate to add to classical feature map 606. In particular embodiments, the portions may be chunks of the quantum circuit that can be simulated in less than a given time or chunks of the quantum circuit that can be emulated and/or approximated by a known function. In particular embodiments, application 602 determines the portions of a classical feature map that match subsections of the quantum feature map using machine learning such as deep learning (DL) and reinforcement learning. In particular embodiments, if no known approximant exists for a part of the quantum feature map and the overall approximation is not at an acceptable level, application 602 selects a candidate for approximation for part of the circuit using symbolic regression to refine the current classical feature map.

If the new approximating function does produce an acceptable level of accuracy, application 602 uses the new (i.e., current) approximating function to either refine the vectors using the same set of objects or use the new approximating function with a new set of samples and repeats the process iteratively until and acceptable level of accuracy is achieved.

Figure 7:
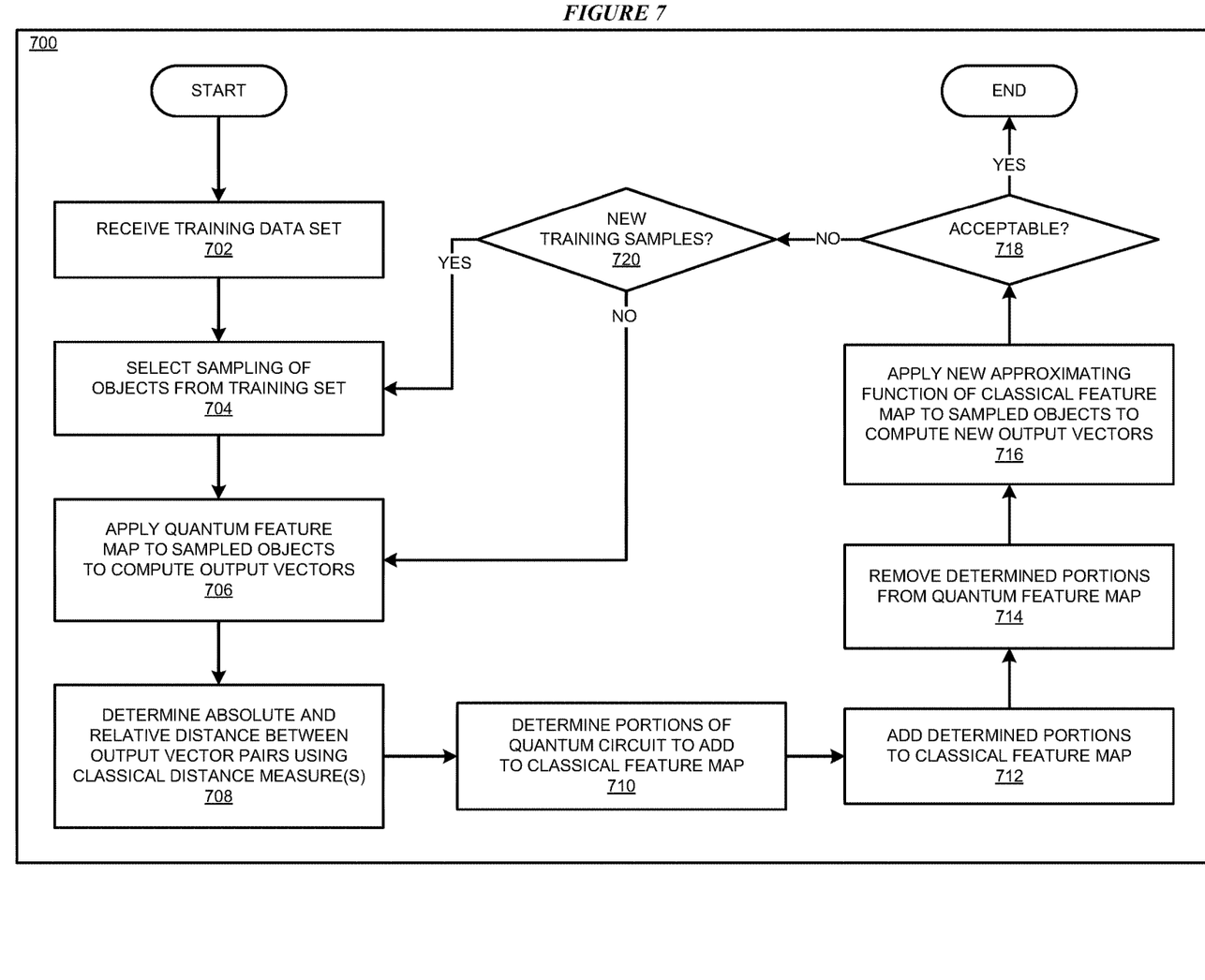
FIG. 7 depicts a flowchart of an example process for quantum space distance estimation for classifier training using a hybrid classical-quantum computing system in accordance with an illustrative embodiment.

With reference to FIG. 7, this figure depicts a flowchart of an example process 700 for quantum space distance estimation for classifier training using a hybrid classical-quantum computing system in accordance with an illustrative embodiment. In block 702, classical processor 122 receives a training data set containing training objects associated with one or more classification categories. In particular embodiments, an object within the training data is represented by one or more vectors. In block 704, classical processor 122 selects a sampling of objects from the training data set. In a particular embodiment, classical processor 122 selects the objects from the training set using a random sampling. In one or more particular embodiments, the objects are randomly selected using a classical distance measure.

In block 706, quantum processor 142 applies a quantum feature map to the input vectors of the sampled objects to compute output vectors. In an alternative embodiment, classical processing system 104 uses a simulation to apply the input vectors to the quantum feature map to generate the output vectors. In block 708, classical processor 122 determines one or more distance measures between pairs of the output vectors. In particular embodiments, classical processor 122 determines both an absolute distance and relative distance between each pair of output vectors.

In block 710, classical processor 122 determines one or more portions of the quantum feature map to add to the classical feature map based upon the one or more distance measures. In particular embodiments, the portions may be portions of the quantum feature map that can be simulated in less than a given time or portions of the quantum feature that can be emulated and/or approximated by a known classical function. In particular embodiments, classical processor 122 determines portions of the classical feature map that match portions of the quantum feature map using machine learning such as deep learning (DL) and/or reinforcement learning. In particular embodiments, if no known approximant exists for a part of the quantum feature map and the overall approximation is not at an acceptable level, classical processor 122 selects a candidate for approximation for part of the circuit using symbolic regression to refine the current classical feature map.

In block 712, classical processor 122 adds a classical implementation of the determined portions of the quantum feature map to the classical feature map to generate an updated classical feature map to generate a new approximating function. In block 714, quantum processor 142 removes the determined portions from the quantum feature map.

In block 716, classical processor 122 applies the new approximating function of the classical feature map to the input vectors to generate new output vectors. In block 718, classical processor 122 determines whether the new (updated) approximating function produces an acceptable level of accuracy, e.g., a measure of accuracy greater than a predetermined threshold value.

If the new approximating function does not produce an approximating function with the acceptable level of accuracy, process 700 continues to block 720. In block 720, classical processor 122 determines whether new training samples should be analyzed to improve the level of accuracy. If new training samples are to be analyzed, process 700 returns to block 704 in which new training samples from the training data set are selected, quantum processor 142 applies the current quantum feature map to the new sampled objects to compute new output vectors in block 706, and process 700 continues.

If no new training samples are to be analyzed, quantum processor 142 applies the current quantum feature map to the same sampled objects to compute new output vectors in block 706, and process 700 continues.

Accordingly, portions of process 700 are repeated iteratively until an acceptable level of accuracy is obtained. In classical processor 122 determines in block 718, that an acceptable level of accuracy is obtained by the approximating function of the current classical feature map and current feature map, process 700 then ends. Accordingly, a trained hybrid classical-quantum classifier is produced. Upon receiving input data that is desired to be classified, the hybrid classical-quantum classifier classifies the received input data to determine a classification of the input data.

Thus, a computer implemented method, system or apparatus, and computer program product are provided in the illustrative embodiments for quantum space distance estimation for classifier and other quantum decision making system training using a hybrid classical-quantum computing system and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for hybrid classical-quantum decision maker training, the method comprising:
   receiving a training data set;
   selecting, by a first processor, a sampling of objects from the training set, each object represented by at least one vector;
   applying, by a quantum processor, a quantum feature map to the selected objects to produce one or more output vectors;
   determining, by the first processor, one or more distance measures between pairs of the output vectors;
   determining, by the first processor, at least one portion of the quantum feature map to modify a classical feature map;
   adding, by the first processor, an implementation of the at least one portion of the quantum feature map to the classical feature map to generate an updated classical feature map;
   applying an updated approximating function of the updated classical feature map to the vectors to generate updated output vectors; and
   determining that the updated approximating function produces a measure of accuracy greater than a predetermined threshold value.

2. The method of claim 1, further comprising:
   removing the determined portions from the quantum feature map to generate an updated quantum feature map.

3. The method of claim 1, further comprising:
   selecting updated training samples from the training data set; and
   applying the updated quantum feature map to the updated sampled objects to compute new output vectors.

4. The method of claim 3, further comprising:
   applying the updated quantum feature map to the selected sampled objects to compute new output vectors.

5. The method of claim 1, wherein the one or more distance measures includes a relative distance between output vector pairs.

6. The method of claim 1, wherein the one or more distance measures includes an absolute distance between output vector pairs.

7. The method of claim 1, wherein the one or more distance measures includes a classical distance measure.

8. The method of claim 1, wherein the at least one portion includes a portion of the quantum feature map implementable by a known classical function.

9. The method of claim 1, wherein the at least one portion is selected based upon machine learning.

10. The method of claim 1, wherein the first processor is a classical processor.

11. A computer usable program product comprising a processor, one or more computer-readable storage devices, and program instructions stored on at least one of the one or more storage devices, the stored program instructions comprising:
   program instructions to receive a training data set;
   program instructions to select, by a first processor, a sampling of objects from the training set, each object represented by at least one vector;
   program instructions to apply, by a quantum processor, a quantum feature map to the selected objects to produce one or more output vectors;
   program instructions to determine, by the first processor, one or more distance measures between pairs of the output vectors;
   program instructions to determine, by the first processor, at least one portion of the quantum feature map to modify a classical feature map;
   program instructions to add, by the first processor, an implementation of the at least one portion of the quantum feature map to the classical feature map to generate an updated classical feature map;
   program instructions to apply an updated approximating function of the updated classical feature map to the vectors to generate updated output vectors; and
   program instructions to determine that the updated approximating function produces a measure of accuracy greater than a predetermined threshold value.

12. The computer usable program product of claim 11, further comprising:
   program instructions to remove the determined portions from the quantum feature map to generate an updated quantum feature map.

13. The computer usable program product of claim 11, further comprising:
   program instructions to select updating training samples from the training data set; and
   program instructions to apply the updated quantum feature map to the updated sampled objects to compute new output vectors.

14. The computer usable program product of claim 11, wherein the is program instructions are stored in a computer readable storage device in a data processing system, and wherein the program instructions are transferred over a network from a remote data processing system.

15. The computer usable program product of claim 12, wherein the is program instructions are stored in a computer readable storage device in a server data processing system, and wherein the program instructions are downloaded over a network to a remote data processing system for use in a computer readable storage device associated with the remote data processing system.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
   program instructions to receive a training data set;

program instructions to select, by a first processor, a sampling of objects from the training set, each object represented by at least one vector;

program instructions to apply, by a quantum processor, a quantum feature map to the selected objects to produce one or more output vectors;

program instructions to determine, by the first processor, one or more distance measures between pairs of the output vectors;

program instructions to determine, by the first processor, at least one portion of the quantum feature map to modify a classical feature map;

program instructions to add, by the first processor, an implementation of the at least one portion of the quantum feature map to the classical feature map to generate an updated classical feature map;

program instructions to apply an updated approximating function of the updated classical feature map to the vectors to generate updated output vectors; and program instructions to determine that the updated approximating function produces a measure of accuracy greater than a predetermined threshold value.

* * * * *